United States Patent [19]

Uyama et al.

[11] 4,102,420

[45] Jul. 25, 1978

[54] ELECTRONIC WEIGHING APPARATUS

[75] Inventors: Noboru Uyama, Osaka; Katsuaki Hara, Tondabayashi, both of Japan

[73] Assignee: Kubota Ltd., Osaka, Japan

[21] Appl. No.: 730,942

[22] Filed: Oct. 8, 1976

[30] Foreign Application Priority Data

Dec. 10, 1975 [JP] Japan .................................. 50-148188

[51] Int. Cl.² .......................................... G01G 19/413
[52] U.S. Cl. ..................................... 177/25; 177/165; 177/DIG. 3; 177/DIG. 6; 364/466
[58] Field of Search ................... 177/DIG. 6, DIG. 3, 177/165, 25; 364/466, 567

[56] References Cited

U.S. PATENT DOCUMENTS

| 3,127,947 | 4/1964 | Vogel | 177/DIG. 6 |
|---|---|---|---|
| 3,740,536 | 6/1973 | Takahashi | 177/DIG. 6 |
| 3,804,188 | 4/1974 | Fukuma | 177/DIG. 6 |
| 3,826,318 | 7/1974 | Baumgartner | 177/DIG. 6 |
| 3,986,012 | 10/1976 | Loshbough | 177/165 X |

*Primary Examiner*—Joseph W. Hartary
*Attorney, Agent, or Firm*—W. G. Fasse; W. W. Roberts

[57] ABSTRACT

An electronic weighing apparatus, comprising: a scale mechanism having a weighing plate for placing an article being weighed, a slit plate provided to be moved associated with the weight of said article on said weighing plate and having a series of slit equally spaced in the moving direction, a light source provided at one side of said slit plate, a photodetector provided at the other side of said slit plate opposite to said light source, whereby a pulse train is generated from said photodetector the number of which pulses is associated with the movement of the slit plate and thus with the weight of said article, a counter for counting the number of pulses of said pulse train for providing the weight value, a display for displaying the weight value in said counter, a zero point detecting circuit for detecting the weighing plate having returned to the zero point, a balanced state detecting circuit for detecting said weighing plate having reached a balanced state, a measurement start switch, a first AND gate receiving the output from said measurement start switch, the output from said zero point detecting circuit and the output from said balanced state detecting circuit for providing an enabling signal, a tare weight deduction instructing switch, a second AND gate receiving the output from said tare weight deduction instructing switch, the output from said balanced state detecting circuit and a signal indicative of the weight value in the counter being plus, a tare weight deduction storing flip-flop responsive to the output from said second AND gate to be set and responsive to said enabling signal from said first AND gate to be reset, and means responsive to said set output from said flip-flop for resetting the tare weight value in the counter obtained for said tare, thereby to enable measurement of only the net weight of said thing.

20 Claims, 6 Drawing Figures

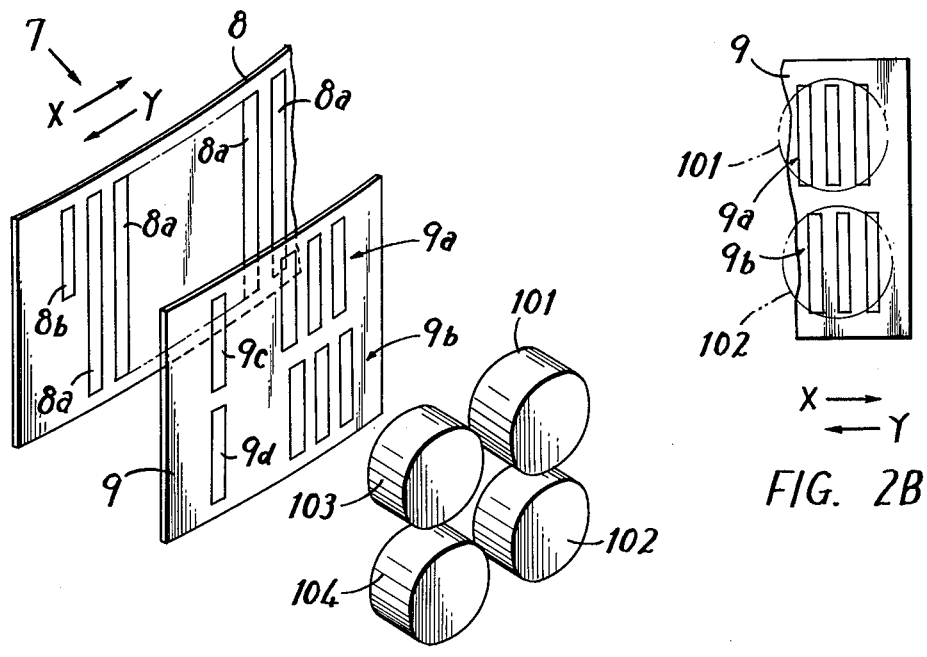
FIG. 2A
FIG. 2B
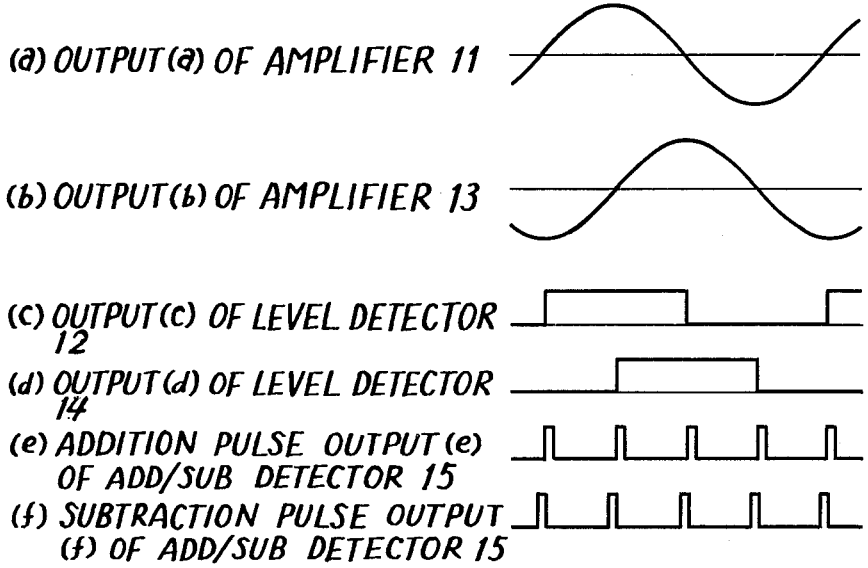
FIG. 3
(a) OUTPUT (a) OF AMPLIFIER 11
(b) OUTPUT (b) OF AMPLIFIER 13
(c) OUTPUT (c) OF LEVEL DETECTOR 12
(d) OUTPUT (d) OF LEVEL DETECTOR 14
(e) ADDITION PULSE OUTPUT (e) OF ADD/SUB DETECTOR 15
(f) SUBTRACTION PULSE OUTPUT (f) OF ADD/SUB DETECTOR 15

ELECTRONIC WEIGHING APPARATUS

BACKGROUND OF THE INVENTION

1. Field of the Invention

The present invention relates to an electronic weighing apparatus. More specifically, the present invention relates to an electronic weighing apparatus for evaluating the price of an article through multiplication of the measured weight of the article by a preset unit price for displaying the price in a digital manner, which has been adapted such that the price of only the net weight of the article is evaluated through deduction of the tare weight from the gross weight of the article.

2. Description of the Prior Art

In measuring the net weight of an article being weighed, it is necessary to deduct the weight of a container containing the article, i.e. the tare weight, from the measured gross weight. It has been a most typical practice in the prior art for the above described deducting operation that only a tare is first placed on an electronic weighing apparatus of a pulse count type, whereupon the counter is reset to zero upon depression of a reset switch. However, such prior art apparatus has suffered from various shortcomings as enumerated in the following.

(1) In making a zero adjustment of the weighing apparatus, the counter could be reset to zero by depressing the reset switch while the weighing plate of the apparatus is slightly raised by a finger erroneously or intentionally. However, this results in improper zero adjustment. Hence a weight value larger than the actual weight of the article could be obtained and an erroneous price higher than the true net price of the article could be evaluated and displayed.

(2) In initially setting the weight of the tare of an article in the apparatus, only the tare is first placed on the weighing plate of the apparatus and then the reset switch is depressed to reset the counter of the apparatus to zero. In such situation as well, the counter could be reset to zero while the weighing plate with the tare placed thereon is slightly raised by a finger erroneously or intentionally. However, this results in improper deduction of the tare weight. Hence, the weight value corresponding to the said raising of the weighing plate could be added to a true net weight.

(3) Since the tare weight resetting can be made at any time, the deducting operation of the tare weight could be effected repeatedly. Such variation of the tare weight as reset in the apparatus can be observed from the display of a weighing apparatus adapted to display the tare weight to be deducted. Display of such an improper tare weight value makes a customer feel distrustful of the weight measurement. This will be described in more detail by taking examples. Assuming that a tare of 100 g is first placed on the weighing apparatus and the tare weight resetting is made, then the tare weight is displayed as 100 g. Assuming further that the former tare is replaced by another tare of 40 g, display of the weight becomes −60 g. If the tare weight deduction is made in such a situation, display of the reset weight becomes 60 g, in spite of the fact that in actuality the tare of 40 g is placed on the weighing plate of the apparatus, resulting in an error of 20 g.

Now assuming that a tare of 100 g is placed on the weighing apparatus and the tare weight deduction is made, then display of the tare weight first becomes 100 g and display of the weight is reset to zero. Assuming further than another tare of 40 g is additionally placed on the apparatus, display of the weight becomes 40 g. If the tare weight deduction is made in such a situation, display of the tare weight becomes 40 g, in spite of the fact that in actuality the tare of 140 g has been placed on the weighing apparatus, resulting in an error of 100 g in conjunction with the tare weight.

SUMMARY OF THE INVENTION

Therefore, a principal object of the present invention is to provide an electronic weighing apparatus capable of preventing improper measurement of weight caused by zero adjustment or tare weight resetting.

Another object of the present invention is to provide an electronic weighing apparatus wherein initial setting of the weight measurement is made subject to returning of the scale mechanism to a zero position.

A further object of the present invention is to provide an electronic weighing apparatus wherein a tare weight deducting operation is enabled only one time whereby repetitive tare weight deducting operation is prevented.

Still a further object of the present invention is to provide an electronic weighing apparatus wherein resetting of the tare weight in the tare weight deducting operation is enabled only when the weighing mechanism has reached a balanced or stabilized condition.

Briefly stated, the present invention comprises an electronic weighing apparatus; comprising a displacement member displaceable in association with the weight of an article being measured, means for converting the displacement value of said displacement member into an electrical signal value associated with said displacement value, digital display means responsive to said electrical signal value for displaying the weight value of said article, means for detecting said displacement means having reached a zero point position, means for detecting said displacement means having reached a stabilized condition, means for instructing weight measurement, and means responsive to the outputs from said zero point detecting means, said stabilized condition detecting means and said measurement instructing means for enabling said display means. Preferably, the apparatus further comprises tare weight deduction operating means, whereby the tare weight is reset responsive to the output from said stabilized condition detecting means, the output from said tare weight deduction operating means and the output indicative of said weight value being positive and thus measurement of the net weight is enabled. As a result, an improved electronic weighing apparatus with digital display is provided wherein any improper weight measurement and misconduct in conjunction with zero adjustment and tare weight resetting can be prevented.

The other objects, features, advantages, and aspects of the present invention will be more apparent from the following detailed description when taken in conjunction with the accompanying drawings.

BRIEF DESCRIPTION OF THE DRAWINGS

FIGS. 2A and 2B are enlarged picturesque views of portions of the weighing scheme shown in FIG. 1;

FIG. 3 shows wave forms of electrical signals at various portions in the FIG. 1 diagram for use in explanation of the operation of the FIG. 1 embodiment, wherein the abscissa has been adapted to correspond with the displacement amount (angle) of a slit plate 8;

DESCRIPTION OF THE PREFERRED EMBODIMENTS

Figure 1:
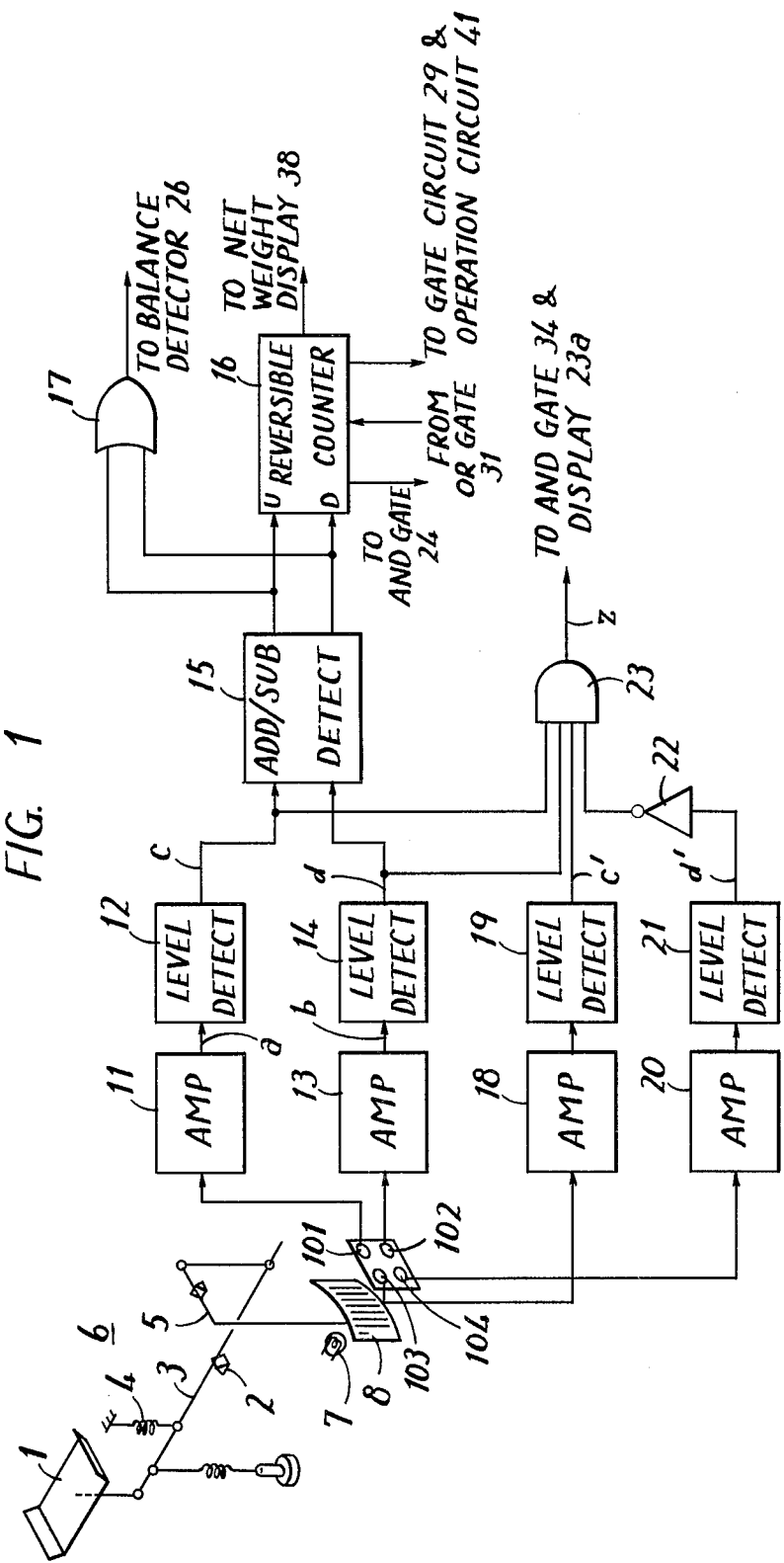
FIG. 1 is a block diagram of a portion of an electrical configuration and a partial picturesque view of a weighing scheme of one embodiment of the present invention.

Referring to FIG. 1, a weighing mechanism 6 comprises a weighing plate 1 for placing an article being meausred (not shown), an arm 3 coupled to said weighing plate 1, and a blade 2 for supporting the arm 3. With the edge of the blade 2 as a supporting point, one side of the arm 3 is urged upward by a spring 4, while the opposite end of the arm 3 is coupled to one end of a lever 5. The lever 5 is also supported by means of another blade with the edge thereof as a supporting point. The opposite end of the lever 5 is coupled to a slit plate 8.

Referring to FIG. 2A, the slit plate 8 is formed of a plurality of slits 8a, 8a, ..., equally spaced and extending in the vertical direction. The slit plate 8 is further formed of an additional slit 8b for use in zero point detection which is as long as a half of the above described slits 8a, 8a..., extending in the vertical direction and equally spaced from the left side of the group of the slits 8a, 8a ... as viewed in FIG. 2A. A light source 7 is provided at the rear surface side of the slit plate 8 to emit light toward the slit plate 8 and another stationary slit plate 9 is provided at the front surface side of the slit plate 8, so that the light beam from the light source 7 is directed through the slit plates 8 and 9 in the direction perpendicular to the plates 8 and 9.

The slit plate 9 is formed of two groups of slits, 9a and 9b, positioned in the upper and lower half portions of the slit plate 9, each slit being as wide as twice the width of the slits 8a and 8b formed in the slit plate 8 and extending in parallel with the slits 8a and 8b of the plate 8. The positional relation of the upper group of the slits 9a and the lower group of the slits 9b is selected such that the upper slits 9a are shifted by a pitch corresponding to a quarter of one cycle of the slit arrangement with respect to the lower slits 9b in the horizontal direction, as shown in FIGS. 2A and 2B. The shifted arrangement of the upper and the lower slits 9a and 9b is aimed to detect the direction of the movement of the weighing plate 1 of the scale mechanism 6. The slit plate 9 is further formed of additional slits 9c and 9d for zero point detection spaced apart leftward from the groups of the slits 9a and 9b side by side, respectively, by a given distance. The said slits 9c and 9b are formed in substantially the same position in terms of the horizontal direction.

The slit plates 8 and 9 may be made of transparent glass plates, coated with an opaque material with the slit portions 8a, 8b; 9a, 9b, 9c and 9d left uncoated so as to form transparent slits. Alternatively, the slit plates 8 and 9 may be opaque plates formed of elongated apertures 8a, 8b; 9a, 9b, 9c and 9d.

Four photodetectors 101, 102, 103 and 104 are provided at the front side of the plate 9 so as to receive the light beam transmitting from the light source through the slits of the slit plates 8 and 9. More specifically, the photodetector 101 is positioned so as to face the group of slits 9a, while the photodetector 102 is positioned so as to face the group of slits 9b, as shown in FIG. 2B. On the other hand, the photodetector 103 is positioned to face the slit 9c, while the photodetector 104 is positioned to face the slit 9d.

Referring again to FIG. 1, the outputs from the photodetectors 101, 102, 103 and 104 are coupled to the corresponding amplifiers 11, 13, 18 and 20, respectively. The outputs from the amplifiers 11, 13, 18 and 20 are fed to level detectors 12, 14, 19 and 21, respectively, each comprising a Schmidt triggering circuit or the like. Each of these level detectors 12, 14, 19 and 21 is adapted to be responsive to each output from the corresponding photodetector 101, 102, 103 or 104 to level detect the output at a predetermined threshold level to provide a rectangle wave output. The rectangle wave outputs from the level detectors 12 and 14 are applied to the input to an addition/subtraction detecting circuit 15 and also applied to the input to an AND gate 23. The addition/subtraction detecting circuit 15 is adapted to be responsive to the outputs from the level detectors 12 and 14 to detect the direction of the movement, i.e. an increasing direction or a decreasing direction, of the weighing plate 1 of the scale mechanism 6, thereby to provide a corresponding pulse train, as to be more fully described subsequently. The increasing or addition pulse, or the decreasing or subtraction pulse obtained from the addition/subtraction detecting circuit 15 is applied to an up count mode input U or a down count mode input D, respectively, of a reversible counter 16 for counting the number of pulses of the pulse train to provide a weight value in a digital manner. The increasing pulse output and the decreasing pulse output from the addition/subtraction detecting circuit 15 are also applied to the inputs to an OR gate 17.

The output from the level detector 19 and an inverted output by an invertor 22 of the output from the level detector 21 are also applied to the said AND gate 23. The output from the AND gate 23 is applied to an AND gate 34 and a zero point detection display 23a (FIG. 5) by way of a zero point detected signal.

Figure 5:
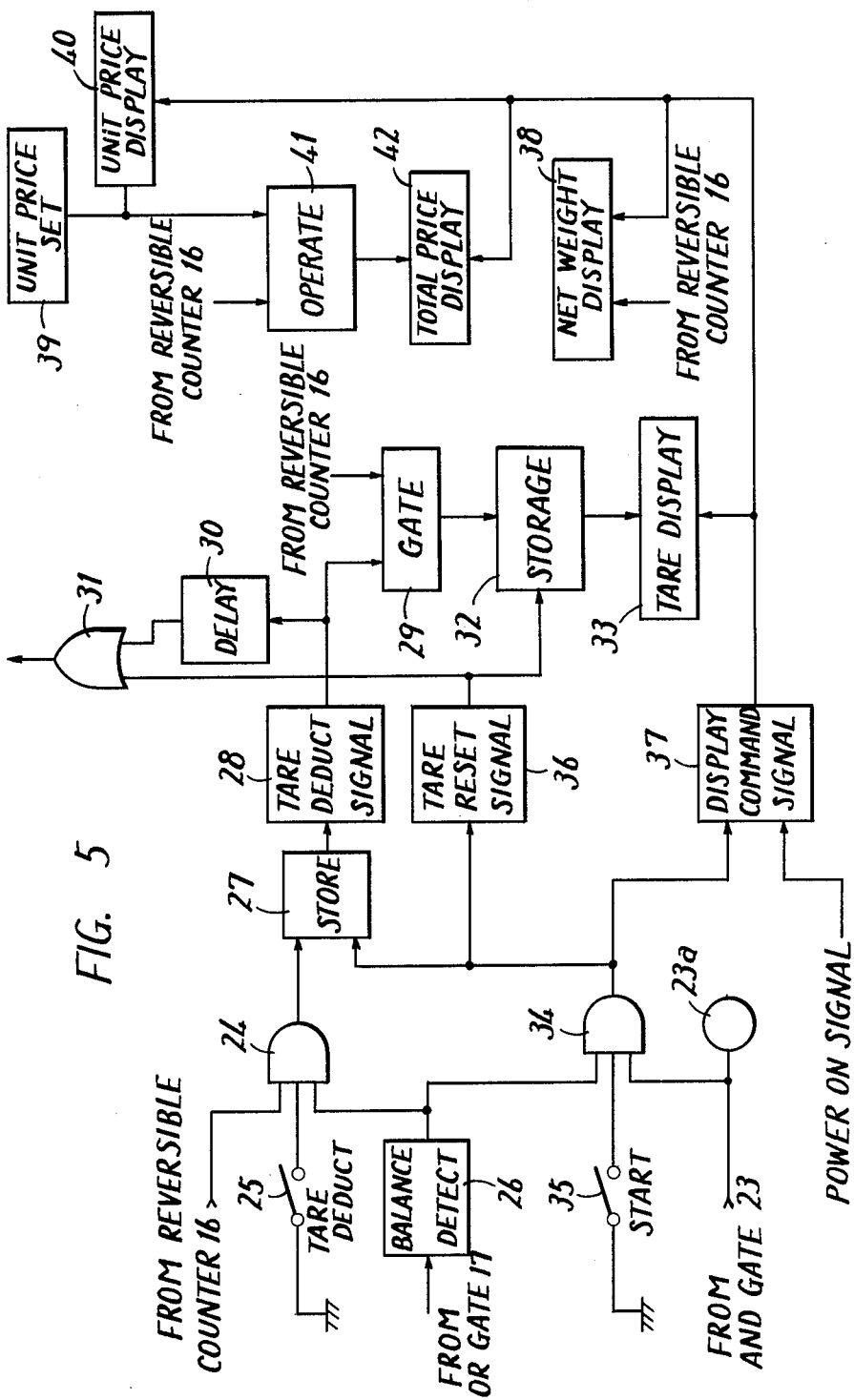
FIG. 5 is a block diagram of the major portion of the embodiment of the present invention.

The weight value output from the reversible counter 16 is applied to an AND gate 24 as one input thereto, a gate circuit 29 as a gating control input, a net weight display 38 as a display input signal and an operation circuit 41 as an operand, as shown in FIG. 5. The reversible counter 16 is supplied with the output from an OR gate 31 (FIG. 5) as a reset input signal.

Now with simultaneous reference to FIGS. 2A and 2B and FIG. 4 as well as FIG. 1, description will be made of the FIG. 1 diagram, before description is made of the operation of the FIG. 5 embodiment of the present invention.

If and when an article being weighed (not shown) is placed on the top surface of the weighing plate 1 of the scale mechanism 6, the arm 3 is rotated anti-clockwise as viewed in FIG. 1 with the edge of the blade 2 as a supporting point, as the spring 4 extends in association with the weight of the article. The arm 3 continues to rock about the supporting point, as the rocking transient diminishes until the arm 3 becomes stabilized where the urging force of the spring caused by the weight of the article and the force of restitution of the spring become balanced. The upward displacement of the opposite end of the arm 3 causes the lever 5 to be rotated about the supporting point at the center thereof anti-clockwise as viewed in FIG. 1, which in turn causes the slit plate 8 provided between the light source 7 and the photodetectors 101 through 104 to be displaced in the rightward direction as viewed in FIG. 1, which corresponds to the X-arrow direction shown in FIG. 2B, and vice versa.

As the slit plate 8 is moved, the slits 8a, 8a, . . . formed on the slit plate 8 permits the light beam from the light source 7 to be transmitted therethrough to the photodetectors 101 through 104 intermittently. As a result, the photodetectors 101 and 102 facing the upper and lower groups of the slits 9a and 9b, respectively, of the slit plate 9 generate such sine wave or sinusidal output signals of the wave forms (a) and (b) in FIG. 3, respectively. It is understood that the output from one photodetector 102 and thus the output (b) from the amplifier 113 is out of phase or delayed in quadrature or 90° with respect to the output from the other photodetector 101 and thus the output (a) from the amplifier 11. The reason is that the slits 9a of the upper slit group and the slits 9b of the lower slit group of the slit plate 9 provided opposite to the photodetectors 101 and 102, respectively, have been displaced from each other by the pitch corresponding to a quarter of one cycle of the slits in the horizontal direction, which makes the timing relation of the light beam reaching the photodetectors 101 and 102 through the slit plates 8 and 9 be out of phase in quadrature or by a quarter of one cycle.

The slit plate 8 is moved in the X-arrow direction or in the Y-arrow direction, as the weighing plate 1 of the scale mechanism 6 is moved in the downward direction or the upward direction, respectively, and thus the relative relation of the output signals from the respective photodetectors 101 and 102 is reversed in both situations. The reason why the phase is shifted in quadrature as described above is that the direction of the movement of the weighing plate 1 is to be detected by means of the addition/subtraction detecting circuit 15 provided in the subsequent stage to determine the addition mode or the subtraction mode in terms of the weight by means of the reversible counter 16.

The outputs a and b from the amplifiers 11 and 13 are fed to the level detectors 12 and 14, respectively. If and when the threshold values of these level detectors 12 and 14 are set to the zero level with respect to the outputs from the amplifiers 11 and 13, the rectangle wave forms c and d shown in FIG. 3 (c) and (d) are obtained from the level detectors 12 and 14, respectively.

Although not shown in detail, the addition/subtraction detecting circuit 15 is adapted to differentiate the rise and fall of the respective outputs c and d of the level detectors 12 and 14 by means of, for example, two differentiating circuits. Assuming that the slit plate 8 is moving in the X-arrow direction, detection is made that the output d is the low level at the rise timing of the output c and the output c is the high level at the rise timing of the ouptut d, whereas the output d is the high level at the fall timing of the output c and the output c is the low level at the fall timing of the output d, whereupon the addition or increase direction is judged and the pulse output from the said two differentiating circuits is adapted to be applied to the up count mode terminal U of the reversible counter 16 by way of an addition pulse train e, as shown in FIG. 3 (e). Conversely, if and when the slit plate 8 is moving in the Y-arrow direction, detection is made that the mutual relation of the outputs c and d is directly opposite to the above described case, whereupon the subtraction or decreasing direction is judged and the pulse output from the said two differentiating circuits is applied to the down count mode input D of the reversible counter 16 by way of a subtraction pulse train f, as shown in FIG. 3 (f).

It is appreciated that the pulse train output e or f from the addition/subtraction detecting circuit 15 to be applied to the up count mode input U or the down count mode input D of the reversible counter 16 has been weighted so as to correspond to a given weight per each pulse. Therefore, the count value in the reversible counter 16 represents the very weight of the article placed on the weighing plate 1 included in the scale mechanism 6, together with the sign of plus or minus. The count value, i.e. the weight value stored in the reversible counter 16 is applied to the gate circuit 29, the net weight display 38 and the operating circuit 41, while the sign output which is the high level or the low level if the count value is plus or minus, respectively, is applied to the AND gate 24.

Now description will be made of the operation of the case where the scale mechanism 6 is returned to the zero point. If and when the article placed on the weighing plate 1 of the scale mechanism 6 is removed from the plate 1, the slit plate 8 is returned to the zero position, so that the slit 8b formed in the slit plate 8 comes to face the slit 9c formed on the slit plate 9. Accordingly, the light beam transmitted from the light source 7 through the slits 8b and 9c impinges on the photodetector 103 facing these slits 8b and 9c and the high level output is obtained from the photodetector 103. On the other hand, in view of the fact that the zero point detecting slit 8b formed on the slit plate 8 is selected to be as long as approximately a half of the remaining weight detecting slits 8a, 8a, . . . , no light beam is detected by the photodetector 104 even at the time of the zero point returning. Accordingly, an output of the low level is obtained at that time from the photodetector 104 facing the slit 9d. The output signals from these two photodetectors 103 and 104 are amplified by the amplifiers 18 and 20, respectively and the output signals therefrom are applied to the respective level detectors 19 and 21, respectively. The threshold values of these level detectors 19 and 21 have been selected to be larger than those of the above described level detectors 12 and 14, so that the time durations of the output signals from these level detectors 19 and 21 may be smaller. Therefore, the wave forms of these outputs c' and d' from these two level detectors 19 and 21 at the time of the zero point returning appear as shown in FIG. 4 (c) and (d).

At that time, the weight detecting photodetectors 101 and 102 receive the light beam transmitted from the light source 7 through the slits 8a, 8a, . . . of the slit plate 8 and the group of slits 9a and 9b of the slit plate 9 corresponding to the zero point position. Accordingly, the outputs from these photodetectors 101 and 102 remain the high level even at the zero point position (shown as "0" in FIG. 4) of the scale mechanism 6. Therefore, the outputs c and d from the corresponding level detectors 12 and 14 remains the high level even at the zero point position, as shown in FIG. 4 (a) and (b).

Figure 4:
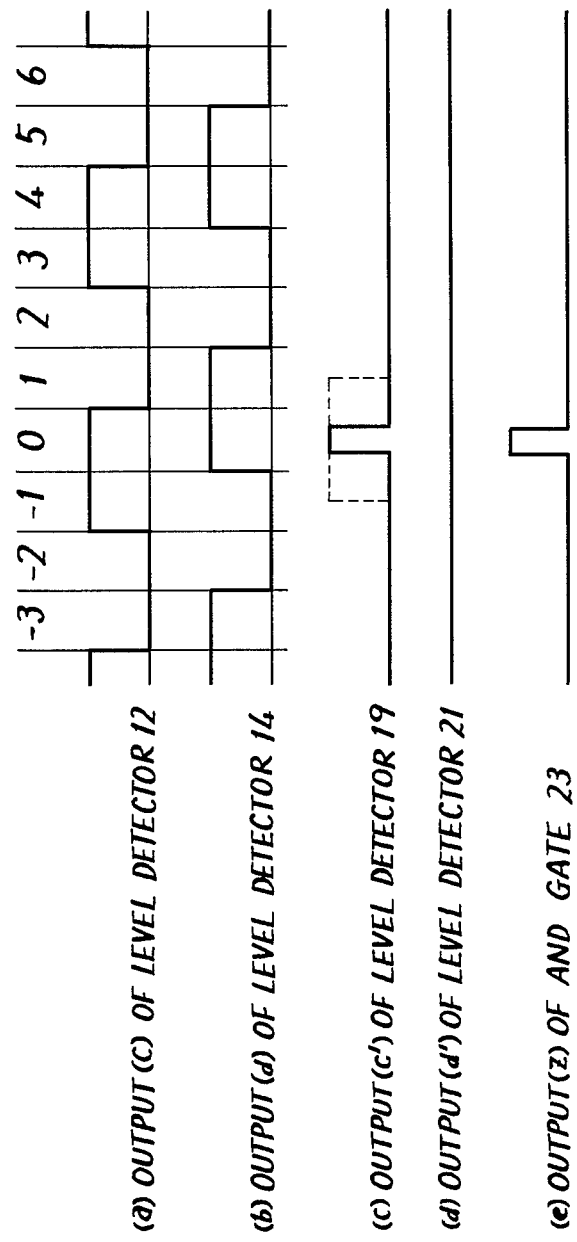
FIG. 4 shows wave forms of electrical signals at the remaining portions in the FIG. 1 diagram for use in explanation of the zero point detecting operation, wherein the abscissa has been adapted to correspond with the displacement amount (angle) of the slit plate 8.

Accordingly, the respective outputs c, d and c' from the level detectors 12, 14 and 19 and the inverted output through the inverter 22 of the output d' from the level detector 21 make the AND gate 23 to provide the zero point detected signal z, as shown in FIG. 4 (e), if and when the scale mechanism 6 is returned to the zero point.

The zero point detected signal z as shown in FIG. 4 (e) has been set by means of the level detector 19 so as to be smaller than the zero point coincidence width of the weight signals $c$ and $d$. Since the zero point signal $z$ is adapted to be obtained by means of the AND gate 23 subject to coincidence of the weight signals $c$ and $d$, even if the width of the zero point detected signal $z$ varies under the influence of the ambient temperature and the like to become wider as shown in the dotted line, for example, it does not follow that detection of the zero point is made at the minus side or the plus side with respect to "0", for example, before or after the zero point coincidence width of the weight signals $c$ and $d$, with the result that the zero point signal $z$ is obtained within the width of the slit 8b at the very zero point of the slit plate 8.

Even at the weight detection other than the above described zero point detecting operation, the photodetectors 103 and 104 receive the light beam through the slits 8a, 8a, . . . and 9. However, in view of the fact that the slit 8a is as long as the total of the lengths of the slit groups 9a and 9b formed on the slit plate 9, the output signals from the photodetectors 103 and 104 both becomes the high level, with the result that no coincidence is established by means of the AND gate 23 and thus no output is obtained by way of the zero point signal $z$. As a result, only if and when the photodetector 103 detects the slit 8b of the slit plate 8, the zero point detected signal is obtained.

Now that the operation of the background of the invention has been described, the embodiment of the present invention shown in FIG. 5 will be described in the following with the foregoing description as a base.

Referring again to FIG. 5, the AND gate 24 is connected to receive the sign signal indicative of whether the count value obtained from the reversible counter 16 shown in FIG. 1 is plus or minus, the output signal from the tare deduction operating switch 25 and the output from the balance detecting circuit 26. Although now shown in detail, the balance detecting circuit 26 may comprise a monostable multi-vibrator and an RC charge/discharge circuit for delaying the output from the monostable multi-vibrator. The balance detecting circuit 26 is adapted to provide a balance detected signal, if and when the pulse output (FIG. 3) applied through the OR gate 17 from the addition/subtraction detecting circuit 15 is not obtained for more than a given time period.

The output from the AND gate 24 is applied to a storing circuit 27 comprising a flip-flop, for example, by way of a set input. The set output from the storing circuit 27 is applied to a tare deduction signal generating circuit 28 comprising a monostable multi-vibrator, for example, by way of a triggering input. The output from the tare deduction signal generating circuit 28 is applied as a gate control input to the gate circuit 29 receiving the weight value or the count value from the reversible counter 16, and is also applied through a delay circuit 30 to one input to the OR gate 31.

The output from the gate circuit 29 is representative of the weight value in the digital manner, for example, and is applied to a storage 32. The weight value transferred from the reversible counter 16 to the storage 32 is applied to the tare display 33.

The balance detected signal from the balance detecting circuit 26 is applied to the AND gate 34 as one input thereto. The AND gate 34 receives as other two inputs thereto the output from the measurement start switch 35 and the zero point detected signal $z$ from the said AND gate 23. The output from the AND gate 34 is applied to the storing circuit 27 as a reset input thereto and is also applied as a triggering input to a tare reset signal generating circuit 36 comprising a monostable multi-vibrator, for example. The output from the AND gate 34 is also applied as a set input to a display command signal generating circuit 37 that comprises a flip-flop, for example, and is adapted to be reset by a pulse signal having a predetermined time duration (power on signal) obtainable at the time of turning on of the power supply. The output from the display command signal generating circuit 37 is applied as a display enable signal to the above described tare display 33, and a net weight display 38, a unit price display 40 and a total price display 42, to be described subsequently.

The tare reset signal of a given time duration obtainable from the tare reset signal generating circuit 36 is applied to the OR gate 31 as the other input thereto and is also applied to the storage 32 as a clear input thereto.

The embodiment shown comprises a price scale that is adapted to be responsive to the measured weight and the unit price to evaluate the price and to display the same. Thus, the embodiment shown comprises a unit price setting circuit 39 comprising a digital switches and the like for the purpose of setting of the unit price. The unit price as set by means of the unit price setting circuit 39 is applied to the unit price display 40 and the operating circuit 41 in the form of a digital signal. The operating circuit 41 makes a multiplying operation of the weight value obtainable from the reversible counter 16 and the set unit price to evaluate the price of the article, which is then applied to the price display 42.

In operation, a power switch (not shown) is first turned on prior to the measurement by the inventive apparatus. Accordingly, a power on signal is obtained and the display command signal generating circuit 37 is reset, so that the display command signal becomes the low level. Accordingly, the respective displays 33, 38, 40 and 42 are disabled. At the initial condition, no article is placed on the weighing plate 1 of the scale mechanism 6. Therefore, the scale mechanism 6 has been returned to the zero point, and as described with reference to FIG. 1, the zero point detected signal $z$ of the high level is obtained from the AND gate 23. Accordingly, the zero point detection display 23a which may comprise a lamp or a light emitting diode is lighted. Since the scale mechanism 6 is also in a balanced state or a stationary state, no pulse output is obtained from the addition/subtraction detecting circuit 15 through the OR gate 17 and accordingly the balance detected signal of the high level is obtained from the balance detecting circuit 26. If and when the meausrement start switch 35 is turned on in such a situation, the output signal of the high level from the AND gate 23, the output signal of the high level from the balance detecting circuit 26 and the high level signal from the switch 35 are applied at the same time to the AND gate 34 to provide the high level output. The display command signal generating circuit 37 is set by the high level output from the AND gate 34, so that the display enabling signal is obtained therefrom and is applied to the respective displays to make the same ready for display.

Prior to measurement of the weight of the article, a tare such as a container for containing the article is first placed on the weighing plate 1 of the scale mechanism 6 and the weight value signal is obtained from the reversible counter 16. Since the weight value thus obtained represents the tare weight not including any net weight of the article, the operation of the net price of the article should be carried out without including the tare weight thus obtained in a net weight of the article to be obtained subsequently. In other words, it is necessary to deduct the tare weight from the gross weight of the article in operation of the net price of the article. If and when the tare is placed on the scale mechanism 6 and the tare weight is measured, the tare weight value is counted by means of the reversible counter 16 and at the same time the high level output signal indicating that the obtained tare weight value in the reversible counter 16 is plus is applied to the AND gate 24. As the scale mechanism 6 reaches a balanced state with the tare placed on the weighing plate 1, the balance detected signal of the high level is obtained from the balance detecting circuit 26 and is applied to the AND gate 24. If and when the tare weight deduction operating switch 25 is turned on in such a situation, the high level output signal from the switch 25 is applied to the AND gate 24. Therefore, the input condition of the AND gate 25 is met and the high level output signal is obtained therefrom, which is applied to the subsequent storing circuit 27. Accordingly, the storing circuit 27 is set by this signal. At the same time, the high level set output signal is obtained from the storing circuit 27. Therefore, the tare weight deduction signal generating circuit 28 generates a pulse output of a given time duration, only if and when the storing circuit 27 is changed from the reset state to the set state, i.e. only at the rise time of the output from the storing circuit 27. As a result, if the tare weight deduction operating switch 25 is turned on and the pulse output signal of a given time duration is once obtained from the tare weight deduction signal generating circuit 28, no output is obtained any more from the tare weight deduction signal generating circuit 28, even if the tare weight deduction operating switch 25 is turned on again, unless the storing circuit 27 is reset by the output from the AND gate 34.

The digital signal representative of the tare weight value stored in the reversible counter 16 is transferred through the gate circuit 29 to the storage 32 as a function of the high level signal from the tare weight deduction signal generating circuit 28. At the same time, the tare weight value is also applied to the tare weight display 33 and is displayed by the same.

After the lapse of a given time period required for storing the data when the tare weight is stored in the storage 32 through the gate circuit 29 as a function of the signal from the tare weight deduction signal generating circuit 28, the high level output is obtained through the delay circuit 30. This high level signal is applied through the OR gate 31 to the reversible counter 16 as a reset signal, so that the data as stored in the reversible counter 16 is reset to zero. In such a situation, the tare weight is displayed by the tare weight display 33, while the contents in the reversible counter 16 have been reset to zero, in spite of the fact that the tare has been placed on the weighing plate 1 of the scale mechanism 6. The tare weight deducting operation is thus effected.

If and when an article being weighed is placed on the weighing plate 1 of the scale mechanism 6 in such a situation, it follows that the weight of only the article is measured and a multiplying operation is made of the measured weight by the unit price as set in advance in the unit price setting circuit 39, with the result that the net price of the net weight of the article excluding the tare weight is evaluated. The net price obtained from the operating circuit 41 is applied to the price display 42 and is displayed thereby. The net weight of the article being weighed stored in the reversible counter 16 is also applied to the net weight display 38 and is displayed thereby. Thus, the net weight of the article being weighed is displayed by the display 38, while the net price corresponding thereto is displayed by the display 42.

After the measurement, the article is removed from the weighing plate 1 of the scale mechanism 6, and the scale mechanism 6 is returned to zero. If and when the measurement start or reset switch 35 is turned on in such a situation, the high level signal is obtained from the AND gate 34. Accordingly, the storing circuit 27 is reset to assume the initial state and the tare weight reset signal generating circuit 37 is triggered. Therefore, a high level signal of a give time duration is obtained from the tare weight reset signal generating circuit 36. The high level output signal from the tare weight reset signal generating circuit 36 resets the reversible counter 16 and the storage 32 to zero.

As described in the foregoing, the embodiment shown and described in structured such that operation of the tare weight deduction operating switch when the scale mechanism as loaded with the tare has become balanced causes the tare weight to be stored in a separate storage, whereupon the tare weight is displayed and the reversible counter originally storing the tare weight is reset to zero. Since it is impossible to keep the weighing plate of the scale mechanism stationary or in a balanced state while the weighing plate loaded with a tare thereon is slightly raised by a finger, an unfair act in the tare weight deducting operation can be prevented.

On the other hand, if the high level signal is once obtained from the tare weight deducting signal generating circuit, the high level signal cannot be obtained any more, unless the tare weight deducting operation storing circuit is reset. As a result, an unfair act for repetitive tare weight deducting operation can be prevented. Further, in case of resetting at the time of the measurement start, the reset signal is not obtained, unless the zero point of the scale mechanism is detected. Accordingly, an unfair act at the time of resetting can also be prevented.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. An electronic weighing apparatus, comprising: means responsive to the weight of an article being weighed for causing a displacement corresponding to the weight of said article, electrical signal providing means responsive to the displacement of said displacement means for providing an electrical signal corresponding to the displacement of said displacement means and thus to the weight of said article, said displacement means assuming an initial position of displacement if and when no article is placed on the apparatus, display means responsive to said electrical signal for displaying the weight of said article, initial position detecting means operatively coupled to said displacement means for indicating by a respective output signal that said displacement means has reached said initial position of displacement, initial state resetting means responsive to the initial position detected output signal from said initial position detecting means for resetting said electrical signal providing means to an initial state, said initial state resetting means comprising initial reset switch means, means responsive to simultaneous outputs from said initial position detecting means and from said initial reset switch means for providing a resetting signal, and means responsive to said resetting signal from said resetting signal providing means for resetting said weight associated electrical signal to the initial value.

2. An electronic weighing apparatus in accordance with claim 1, wherein said electrical signal providing means comprises means responsive to the displacement of said displacement means for generating a pulse train comprising a number of pulses which correspond to the displacement of said displacement means, and counting means operatively coupled to said pulse train generating means for counting the number of pulses in the pulse train.

3. An electronic weighing apparatus in accordance with claim 2, wherein said pulse train generating means comprises
- a movable grating member movable in association with the displacement of said displacement means and having an arrangement of transparent portions for detection of the weight equally spaced in an opaque background portion and arranged in the displacement direction of said movable grating member,
- light source means provided at one side of said movable grating member for emitting a light beam toward said movable grating member,
- photodetecting means provided on the other side of said movable grating member opposite to said light source means for receiving the light beam from said light source means through said movable grating member, and
- means responsive to the output from said photodetecting means for pulsing the output into a pulse form.

4. An electronic weighing apparatus in accordance with claim 3, wherein said pulse train generating means further comprises a stationary grating member fixedly provided between said movable grating member and said photodetecting member, said stationary grating means being formed of two slits dislocated in the displacement direction of said movable grating member, said photodetecting means comprises two photodetectors provided individually opposite to said two slits, and which further comprises means responsive to the outputs from said two photodetectors for detecting the direction of the movement of said movable grating member.

5. An electronic weighing apparatus in accordance with claim 2, wherein said counting means are adapted to be responsive to the resetting signal output from said resetting signal providing means to be reset to an initial value.

6. An electronic weighing apparatus in accordance with claim 1, wherein said initial position detecting means comprises
- initial position mark means formed on a predetermined position of said displacement means, and
- means for detecting said initial position mark means of said predetermined position if and when said displacement means has returned to said initial position of displacement.

7. An electronic weighing apparatus in accordance with claim 6, wherein said electrical signal providing means comprises

- a movable grating member movable in association with the displacement of said displacement means and having a series of transparent portions for detection of the weight in an opaque background portion and arranged in the displacement direction of said movable grating member, and
- light source means provided in a fixed position on one side of said movable grating member.

8. An electronic weighing apparatus in accordance with claim 7, wherein said initial position mark means comprises a transparent portion for detection of said initial position separately provided from the transparent portions for detection of the weight, and said initial position mark means detecting means comprises additional photodetecting means provided to receive the light beam from said light source means through said transparent portion for detection of the initial position if and when said movable grating member is in the initial position.

9. An electronic weighing apparatus in accordance with claim 1, which further comprises means for detecting said displacement means having reached a balanced state, and in which said initial state resetting means is further adapted to be responsive to the balanced state detected output from said balanced state detecting means.

10. An electronic weighing apparatus in accordance with claim 9, wherein said electrical signal providing means comprises means responsive to the displacement of said displacement means for generating a pulse train comprising a number of pulses which correspond to the displacement of said displacement means, and
said balanced state detecting means is adapted to provide the balanced state detected output if and when no pulse output is obtained from said pulse train generating means for a predetermined time period.

11. An electronic weighing apparatus in accordance with claim 1, which further comprises means for setting data concerning the unit price of said article,
means for effecting a multiplying operation of said weight of said article by said set unit price of said article for evaluating the price of said article, and
display means responsive to said price evaluating means for displaying said price of said article.

12. An electronic weighing apparatus, comprising: means responsive to the weight of an article for causing displacement representing the gross weight of said article, said article being packaged so that the gross weight of the article includes a tare weight component, electrical signal providing means operatively coupled to said displacement means for providing an electrical signal representing the displacement of said displacement means and thus the gross weight of said article, means operatively coupled to said displacement means for detecting that said displacement means has reached a balanced state, means for instructing the deduction of said tare weight component from the gross weight of said article, and tare weight deducting means responsive to the balanced state detected output from said balanced state detecting means and the output from said tare weight deduction instructing means for deducting the tare weight component from the gross weight of said article for providing a net weight of the package content, said tare weight deducting means comprising means responsive to simultaneous outputs from said balanced state detecting means and from said tare weight deduction instructing means for providing a tare weight deduction signal, storage means, means responsive to said tare weight deduction signal for transferring an electrical signal representing the tare weight component of said gross weight representing signal to said storage means, resetting means responsive to said tare weight deduction signal for resetting said electrical signal providing means after the tare weight component signal is transferred from said electrical signal providing means to said storage means, wherein said displacement means assumes an initial position of displacement if no article is placed on said apparatus, said apparatus further comprising initial position detecting means operatively coupled to said displacement means for detecting that said displacement means has reached said initial position of displacement, and initial state resetting means responsive to an output signal from said initial position detecting means for resetting the weight associated electrical signal in said electrical signal providing means to the initial state, said storage means being further adapted to be cleared in response to the output from said initial state resetting means.

13. An electronic weighing apparatus in accordance with claim 12, wherein said electrical signal providing means comprises means responsive to the displacement of said displacement means for generating a pulse train comprising a number of pulses representing said displacement and means operatively coupled to said pulse train generating means for counting the number of pulses in the pulse train.

14. An electronic weighing apparatus in accordance with claim 13, wherein said pulse train generating means comprises
   a movable grating member movable in association with the displacement of said displacement means and having an arrangment of transparent portions equally spaced in an opaque background portion and arranged in the displacement direction of said movable grating member,
   light source means provided at one side of said movable grating member for emitting a light beam toward said movable grating member,
   photodetecting means provided on the other side of said movable grating member opposite to said light source means for receiving the light beam from said light source means through said movable grating member, and
   means responsive to the output from said photodetecting means for pulsing the output into a pulse form.

15. An electronic weighing apparatus in accordance with claim 14, wherein said pulse train generating means further comprises a stationary grating member mounted in a fixed position between said movable grating member and said photodetecting means, said stationary grating means being formed of two slits dislocated in the displacement direction of said movable grating member, said photodetecting means comprises two photodetectors provided individually opposite to said two slits, and which further comprises means responsive to the outputs from said two photodetectors for detecting the direction of the movement of said movable grating member.

16. An electronic weighing apparatus in accordance with claim 12, which further comprises means operatively coupled to said storage means for displaying the tare weight stored in said storage means.

17. An electronic weighing apparatus in accordance with claim 12, wherein said electrical signal providing means comprises
   means responsive to the displacement of said displacement means for generating a pulse train comprising a number of pulses which represent the displacement of said displacement means, and
   means operatively coupled to said pulse train generating means for counting the number of pulses of said pulse train, whereby the count value in said counting means is stored in said storage means responsive to said tare weight deduction signal from said tare weight signal providing means, whereupon said counting means is reset.

18. An electronic weighing apparatus in accordance with claim 12, wherein said balanced state detecting means is adapted to provide the balanced state detected output if and when no pulse output is obtained from said pulse train generating means for a predetermined time period.

19. An electronic weighing apparatus in accordance with claim 12, wherein said initial position detecting means comprises
   initial position mark means formed on a predetermined position of said displacement means, and
   means for detecting said initial position mark means of said predetermined position if and when said displacement means has returned to said initial position.

20. An electronic weighing apparatus in accordance with claim 19, wherein said electrical signal providing means comprises
   a movable grating member movable in association with the displacement of said displacement means and having a series of transparent portions for detection of the weight in an opaque background portion and arranged in the moving direction of said movable grating member, and
   light source means provided fixedly on one side of said movable grating member, and wherein
   said initial position mark means comprises a transparent portion for detection of said initial position separately provided from the transparent portions for detection of the weight, and said initial position mark means detecting means comprises additional photodetecting means provided to receive the light beam from said light source means through said transparent portion for detection of the initial position if and when said movable grating member is in the initial position.

* * * * *

UNITED STATES PATENT OFFICE
CERTIFICATE OF CORRECTION

Patent No. 4,102,420　　　　　　　Dated July 25, 1978

Inventor(s) Noboru Uyama et al

It is certified that error appears in the above-identified patent and that said Letters Patent are hereby corrected as shown below:

Claim 4, line 43, column 11, change "photodetecting member" to --photodetecting means--;

Claim 4, line 44, column 11, change "means" to --member--.

Signed and Sealed this

Twelfth Day of June 1979

[SEAL]

Attest:

RUTH C. MASON
Attesting Officer

DONALD W. BANNER
Commissioner of Patents and Trademarks